US008566858B2

(12) United States Patent
Putnam

(10) Patent No.: US 8,566,858 B2
(45) Date of Patent: Oct. 22, 2013

(54) METHOD, SYSTEM AND PROGRAM PRODUCT FOR BROADCAST ERROR PROTECTION OF CONTENT ELEMENTS UTILIZING DIGITAL ARTIFACTS

(75) Inventor: Jon S. Putnam, Goodyear, AZ (US)

(73) Assignee: Forefront Assets Limited Liability Company, Wilmington, DE (US)

(*) Notice: Subject to any disclaimer, the term of this patent is extended or adjusted under 35 U.S.C. 154(b) by 1036 days.

(21) Appl. No.: 11/533,754

(22) Filed: Sep. 20, 2006
(Under 37 CFR 1.47)

(65) Prior Publication Data
US 2007/0256089 A1    Nov. 1, 2007

Related U.S. Application Data

(60) Provisional application No. 60/718,865, filed on Sep. 20, 2005.

(51) Int. Cl.
H04H 20/12    (2008.01)
(52) U.S. Cl.
USPC .......................................................... 725/22
(58) Field of Classification Search
USPC .......................................................... 725/22
See application file for complete search history.

(56) References Cited

U.S. PATENT DOCUMENTS

| 4,025,851 A | 5/1977 | Haselwood et al. |
| 4,457,804 A | 7/1984 | Reinhall |
| 4,497,060 A | 1/1985 | Yang |

(Continued)

FOREIGN PATENT DOCUMENTS

| EP | 0 859 503 A3 | 2/1997 |
| EP | 0 899 688 A2 | 3/1999 |

(Continued)

OTHER PUBLICATIONS

Putnam, Method, System and Program Product for the Insertion and Retrieval of Identifying Artifacts in Transmitted Lossy and Lossless Data, PCT Notification of Transmittal of the International Search Report and The Written Opinion of the International Searching Authority, or the Declaration, Aug. 7, 2007, PCT/US06/36663, CeloData, Inc.

(Continued)

Primary Examiner — Nicholas Corbo
(74) Attorney, Agent, or Firm — Christensen O'Connor Johnson Kindness PLLC

(57) ABSTRACT

Automatically matching local broadcast station copies of commercial content to previously identified content that is centrally attributed to a unique identification code is provided. A local broadcast station receives digital audio and processes the contents into a data profile of 1,024 bits. The data profile is compared with a master database of other content data profiles until an identical match is found. A corresponding commercial identifier is employed to identify the subject content digital audio file to the station's Broadcast Production System. The determined commercial identifier is injected as a digital artifact into the carrier of the content digital audio file, and associatively stored with the content digital audio file. During the performance process, the appropriate commercial content digital audio file is sequenced by matching the commercial identifier associated with the digital audio file. A verification of an accurate association between the commercial identifier and the content digital audio is performed by reading the digital audio file and extracting the commercial identifier in its digital artifact form from the body of the digital audio file's carrier.

17 Claims, 3 Drawing Sheets

(56) References Cited

U.S. PATENT DOCUMENTS

| | | | |
|---|---|---|---|
| 4,639,779 | A | 1/1987 | Greenburg |
| 4,805,020 | A | 2/1989 | Greenburg |
| 4,876,617 | A | 10/1989 | Best et al. |
| 5,019,899 | A * | 5/1991 | Boles et al. ............ 725/22 |
| 5,113,437 | A | 5/1992 | Best et al. |
| 5,128,933 | A | 7/1992 | Baranoff-Rossine |
| 5,319,735 | A | 6/1994 | Preuss et al. |
| 5,379,345 | A | 1/1995 | Greenburg |
| 5,450,122 | A | 9/1995 | Keene |
| 5,450,490 | A | 9/1995 | Jensen et al. |
| 5,600,573 | A | 2/1997 | Hendricks et al. |
| 5,613,004 | A | 3/1997 | Cooperman et al. |
| 5,636,292 | A | 6/1997 | Rhoads |
| 5,659,350 | A | 8/1997 | Hendricks et al. |
| 5,663,766 | A | 9/1997 | Sizer, II |
| 5,687,236 | A | 11/1997 | Moskowitz et al. |
| 5,737,025 | A | 4/1998 | Dougherty et al. |
| 5,828,270 | A | 10/1998 | Chang |
| 5,850,481 | A | 12/1998 | Rhoads |
| 5,872,588 | A * | 2/1999 | Aras et al. ............ 725/14 |
| 5,889,868 | A | 3/1999 | Moskowitz et al. |
| 5,905,800 | A | 5/1999 | Moskowitz et al. |
| 5,940,135 | A | 8/1999 | Petrovic et al. |
| 6,026,193 | A | 2/2000 | Rhoads |
| 6,035,177 | A | 3/2000 | Moses et al. |
| 6,047,374 | A | 4/2000 | Barton |
| 6,101,604 | A | 8/2000 | Barton |
| 6,163,842 | A | 12/2000 | Barton |
| 6,205,249 | B1 | 3/2001 | Moskowitz |
| 6,216,228 | B1 | 4/2001 | Chapman et al. |
| 6,285,774 | B1 | 9/2001 | Schumann et al. |
| 6,604,224 | B1 * | 8/2003 | Armstrong et al. ............ 714/819 |
| 6,625,295 | B1 | 9/2003 | Wolfgang et al. |
| 6,718,551 | B1 * | 4/2004 | Swix et al. ............ 725/32 |
| 6,721,437 | B1 | 4/2004 | Ezaki et al. |
| 6,769,127 | B1 | 7/2004 | Bonomi et al. |
| 7,039,931 | B2 | 5/2006 | Whymark |
| 7,124,442 | B2 | 10/2006 | Nash-Putnam |
| 2002/0076043 | A1 | 6/2002 | Van Der Vleuten et al. |
| 2002/0178445 | A1 * | 11/2002 | Eldering et al. ............ 725/32 |
| 2004/0015400 | A1 * | 1/2004 | Whymark ............ 705/14 |
| 2004/0025176 | A1 * | 2/2004 | Franklin et al. ............ 725/22 |
| 2005/0166237 | A1 | 7/2005 | Kawakami |

FOREIGN PATENT DOCUMENTS

| | | |
|---|---|---|
| EP | 1 031 944 A1 | 8/2000 |
| EP | 1 063 833 A2 | 12/2000 |
| EP | 1 075 108 A1 | 2/2001 |
| EP | 1 079 627 A1 | 2/2001 |
| WO | WO 00/25203 | 5/2000 |
| WO | WO 00/54453 | 9/2000 |
| WO | WO/01/22652 A2 | 3/2001 |
| WO | WO 01/45316 A1 | 6/2001 |
| WO | WO 01/45410 A2 | 6/2001 |

OTHER PUBLICATIONS

Zeng, Fan-Gang, Interactions of Forward Masking and Simultaneous Masking in Intensity Discrimination. Journal of Acoustic Society of America, 1998, vol. 103, pp. 2021-2030.

Wehr, Michael and Zador, A.M., Synaptic Mechanisms of Forward Suppression in Rat Auditory Cortex, Neuron, 2005, vol. 47, pp. 473-445.

Meddis, Ray and O'Mard, L.P., Computer Model of the Auditory-Nerve Response to Forward Masking Stimuli, Journal of Acoustic Society America, 2005, vol. 117, pp. 3788-3798.

Langemann, U. and G.M. Klump, Signal Detection in Amplitude-Modulated Maskers, European Journal of Neuroscience, 2001, vol. 13, pp. 1025-1032.

Jones, E.G., Viewpoint: The core and Matrix of Thalamic Organization, Neuroscience, 1998 vol. 85, pp. 331-345.

Heinz, Michael G., Colburn, H.S., and Carney, L.H., Quantifying the Implications of Non-linear Tuning for Auditory-Filter Estimates. Journal of Acoustic Society of America, 2002, vol. 111, pp. 978-990.

Gockel, Hedwig, et al. Louder Sounds Can Produce Less Forward Masking: Effects of Component Phase in Complex Tones, Journal of Acoustic Society of America, 2003 vol. 114, pp. 114,978-990.

Denham, Susan L., A Model of Temporal Response Properties in Primary Auditory Cortex, 2001.

Malangone, Carmine—Office Action dated Jan. 26, 2009; U.S. Appl. No. 11/533,760.

Corbo, Nicholas T.—Office Action dated Dec. 2, 2008; U.S. Appl. No. 11/533,748.

Corbo, Nicholas T.—Office Action dated Sep. 3, 2009; U.S. Appl. No. 11/533,748.

* cited by examiner

METHOD, SYSTEM AND PROGRAM PRODUCT FOR BROADCAST ERROR PROTECTION OF CONTENT ELEMENTS UTILIZING DIGITAL ARTIFACTS

PRIORITY CLAIM

The application claims the benefit of priority under 35 U.S.C. §119(e) from U.S. Provisional Application No. 60/718,865, entitled, "A System and Method for Broadcast Error Protection of Content Elements Utilizing Digital Artifacts," filed on Sep. 20, 2005, which is incorporated herein by reference in its entirety.

CROSS-REFERENCE TO RELATED APPLICATIONS

The present application is related to the following co-pending U.S. patent applications filed on even date herewith, owned by the assignee hereof, and which are hereby incorporated herein by reference in their entirety:

Application No. 11/533,697, entitled "Method, System and Program Product for the Insertion and Retrieval of Identifying Artifacts in Transmitted Lossy and Lossless Data."

Application No. 11/533,748, entitled "Method, System and Program Product for Broadcast Advertising and Other Broadcast Content Performance Verification Utilizing Digital Artifacts."

Application No. 11/533,760, entitled "Method, System and Program Product for Broadcast Operations Utilizing Internet Protocol and Digital Artifacts."

BACKGROUND

It is desirable to insure that the correct advertisement is performed by radio and television broadcasters in accordance with contractual representations agreed upon between the broadcaster and the advertiser. Important to this performance is content compliance in performance contracts where multiple content elements are involved and the performance contract, known within the broadcast industry as an "Insertion Order," requires the broadcast of a specific advertising content element, known within the industry as a "commercial" or "spot" to be performed during a certain period of time on a date or range of dates specified in the Insertion Order.

Previously, this process has been performed manually with unreliable results. For example, an individual manually causes a digital audio file containing the commercial content to be downloaded into a radio broadcaster's broadcast production database, which contains all other commercial content and programming content to be performed by the radio station on upcoming broadcasts. Human error may cause the identity of the content to be confused, misidentified, or through typographical error mis-attributed. The result of this error may be the failure of the broadcaster to comply with the terms and conditions of the Insertion Order and the loss of revenues resultant from that failure.

This sequence of events are compounded in the present radio and television broadcast environment, where a number of radio or television stations are owned and operated by a single entity, known within the broadcast industry as a "Group." In Groups, advertisements are frequently ordered from a location other than the individual broadcast station. Also frequently, the result is a lack of coordination between the ordering and execution processes.

Although a system such as that described above is typically sufficient for the particular purposes for which they were designed and used in individual broadcast stations, they suffer from typical human errors and certain discontinuities when applied to the complex systems of Group advertising sales and purchase ordering.

SUMMARY

In accordance with the present disclosure, improved methods, systems and program products for automatically matching local broadcast station copies of commercial content to previously identified content that is centrally attributed to a unique identification code is provided. In an illustrated embodiment of the present disclosure, a local broadcast station receives digital audio (and/or video) files containing advertising content and an electronic data file containing performance instructions through the Internet or any other data communications channel. Alternatively, the station may receive this content in the form of digital audio files contained within a compact disc or digital audio tape and the performance instructions in a physical document. In either modality, the subject content digital audio file is processed through an appropriate computer algorithm that digests the contents of the digital audio file into a data profile of 1,024 bits or less that has a reference accuracy of plus or minus (±) one bit when the process is reversed and the result is compared with the original subject digital audio file.

The data profile of the subject content digital audio file is compared with a master database of other content data profiles until an identical match is found. This match identifies the subject content digital audio file. A corresponding commercial identifier stored in the master content profile database is then employed to identify the subject content digital audio file to the station's Broadcast Production System.

The determined commercial identifier is injected as a digital artifact into the carrier of the content digital audio file and the commercial identifier is associatively stored in the Broadcast Production System's Broadcast Content Database along with the content digital audio file. The same commercial identifier is associatively stored with each appropriate instance for performance of the content digital audio file called for in the Insertion Order, which is stored in the Broadcast Accounting System's Insertion Order Database.

During the performance process, the instructions from the station's Broadcast Accounting System cause the appropriate commercial content digital audio file to be sequenced in an Insertion Order instruction by matching the commercial identifier associated with the digital audio file. A verification of an accurate association between the commercial identifier and the content digital audio is performed by reading the digital audio file and extracting the commercial identifier in its digital artifact form from the body of the digital audio file's carrier. This verification assures that the appropriate commercial content will be transmitted by the Broadcast Production System at the date and time called for in the instructions contained in the Insertion Order.

All objects, features, and advantages of the present disclosure will become apparent in the following detailed written description.

BRIEF DESCRIPTION OF THE DRAWINGS

In the following detailed description of representative embodiments of the disclosure, reference is made to the accompanying drawings, which form a part hereof, and in which is shown by way of illustration specific representative embodiments in which the disclosure may be practiced, as follows.

In the accompanying drawings, in which like numbers represent the same or similar elements and one or a plurality of such elements, features might not be to scale and may be shown in generalized or schematic form or may be identified solely by name or other commercial designation.

DETAILED DESCRIPTION

In the following detailed description of representative embodiments of the disclosure, specific representative embodiments in which the disclosure may be practiced are described in sufficient detail to enable those skilled in the art to practice the disclosure, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims. In particular, although the illustrated embodiment is described below with primary respect to a radio broadcast system, it will be appreciated that the present disclosure is not limited to such implementations, and may be implemented in radio, television, Internet, cellular, Wi-Fi, Wi-MAX, satellite, local area network, wide area network, a public switched telephone network, a wireless network, fiber-optic network, microwave transmission link, and other broadcast systems.

Figure 1:
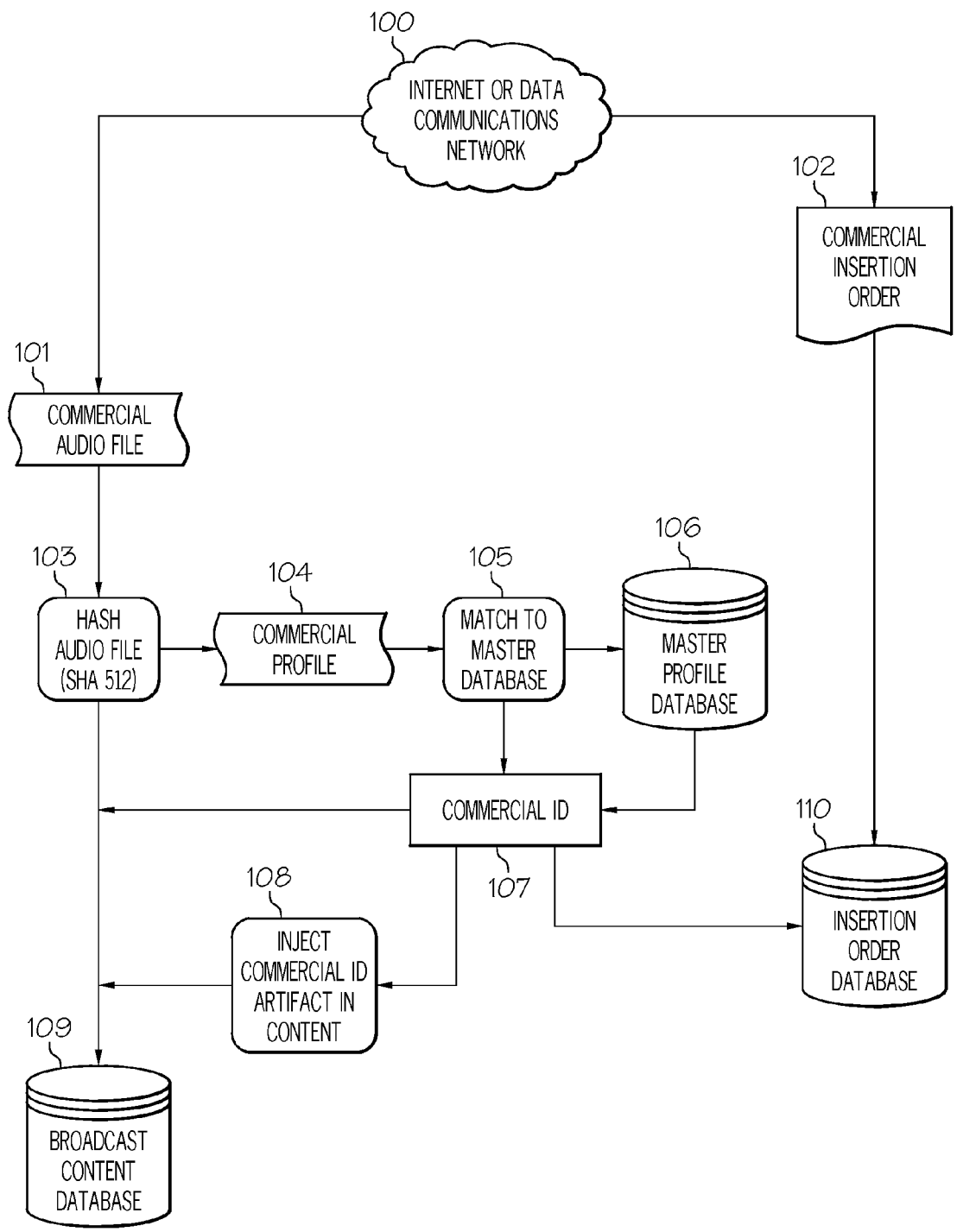
FIG. 1 is a data flow diagram for the association of commercial audio files with an accurate and verified commercial identifier, in accordance with a representative embodiment of the present disclosure.

As shown in the data flow diagram of FIG. 1, broadcast advertisements are ordered by advertisers through the use of purchase contract called a Commercial Insertion Order (102) with commercial broadcasters. This document instructs the radio or television broadcast station to broadcast the advertisements either at a specific date and time or within a set of day and time parameters (e.g., Monday to Friday and 6:00 AM to 10:00 AM). A Broadcast Accounting System, known within the industry as a "Traffic" system, is utilized to record the order and track its performance during the period of the order, known within the industry as a "Flight."

In an illustrated embodiment of the present disclosure, a Commercial Audio File (101) in the form of a digital audio file, either transmitted to the station through the Internet or any other data communications network (100), or transmitted in the physical form of a compact disc (CD) or a digital audio tape (DAT), is received by the radio or television broadcast station.

The Commercial Audio File (101) should be accurately associated with the instructions for its performance contained in the Commercial Insertion Order (102) in order to comply with the terms and conditions of the performance contract. In order to accomplish this objective, the Commercial Audio File (101) is subjected to a process that accurately associates its contents with an appropriate commercial identifier (Commercial ID (107)), which in one embodiment is an alphanumeric code of any length necessary to uniquely identify the subject commercial content. The Commercial ID (107) is previously and accurately associated with a master copy of the commercial content stored in a central database, and is also accurately contained in the instruction set of the Commercial Insertion Order (102).

The sequence of the associative process commences with the subject content being digested by an appropriate computer algorithm to perform a hash function on the audio file (103) into a Commercial Profile (104) of no more that 1,024 bits. The Commercial Audio File (101) creates a profile with an accuracy of plus or minus (±) one (1) bit when the algorithmic process is reversed and the original digital audio file is compared with the target digital audio file first digested and then undigested algorithmically. The resulting Commercial Profile (104) created by the digesting algorithm is then subjected to a further process (105) that compares the digested Commercial Profile (104) to a collection of all authenticated Commercial Profiles stored in a Master Profile Database (106) on the Artifact Control System.

Figure 2:
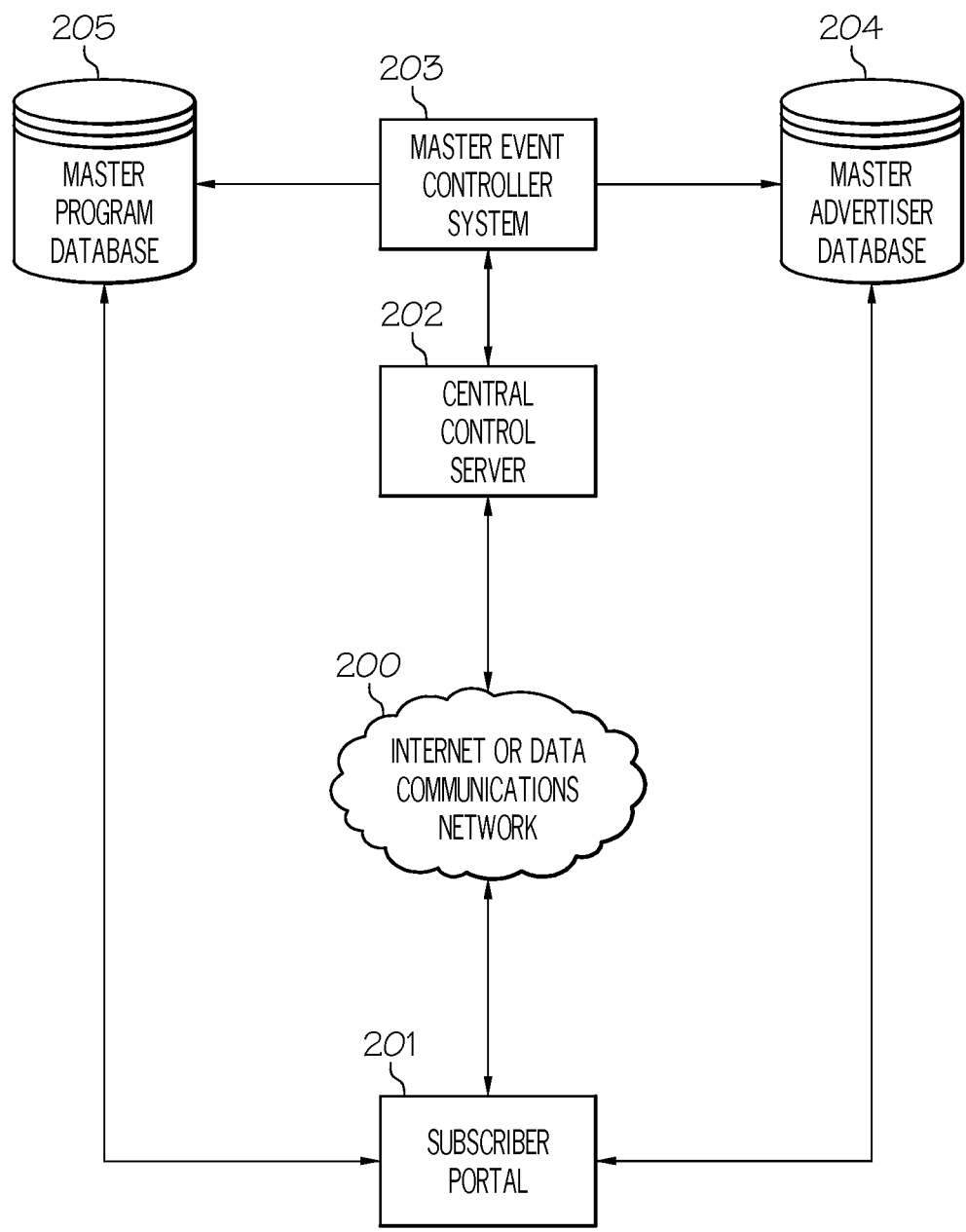
FIG. 2 is a block diagram of a central control system, in accordance with a representative embodiment of the present disclosure.

With reference to FIG. 2, there is shown a block diagram of a central control system, in accordance with a representative embodiment of the present disclosure. If no match to the Commercial Profile (104) can be found to a collection of all authenticated Commercial Profiles stored in a Master Profile Database (106), a request is made through the Internet or any other form of data communications network (100) to a central control system to attempt a match in a Master Advertiser Database 204. The received request containing the Commercial Profile (104) is sent by the subscriber portal 201 via the Internet or data communications network 200, and is forwarded by the Central Control Server (202) to the Master Event Controller System (203), which performs a search process on the Master Advertiser Database (204) to compare the Commercial Profile (104) to a collection of all authenticated Commercial Profiles stored in a Master Advertiser Database (204).

Figure 3:
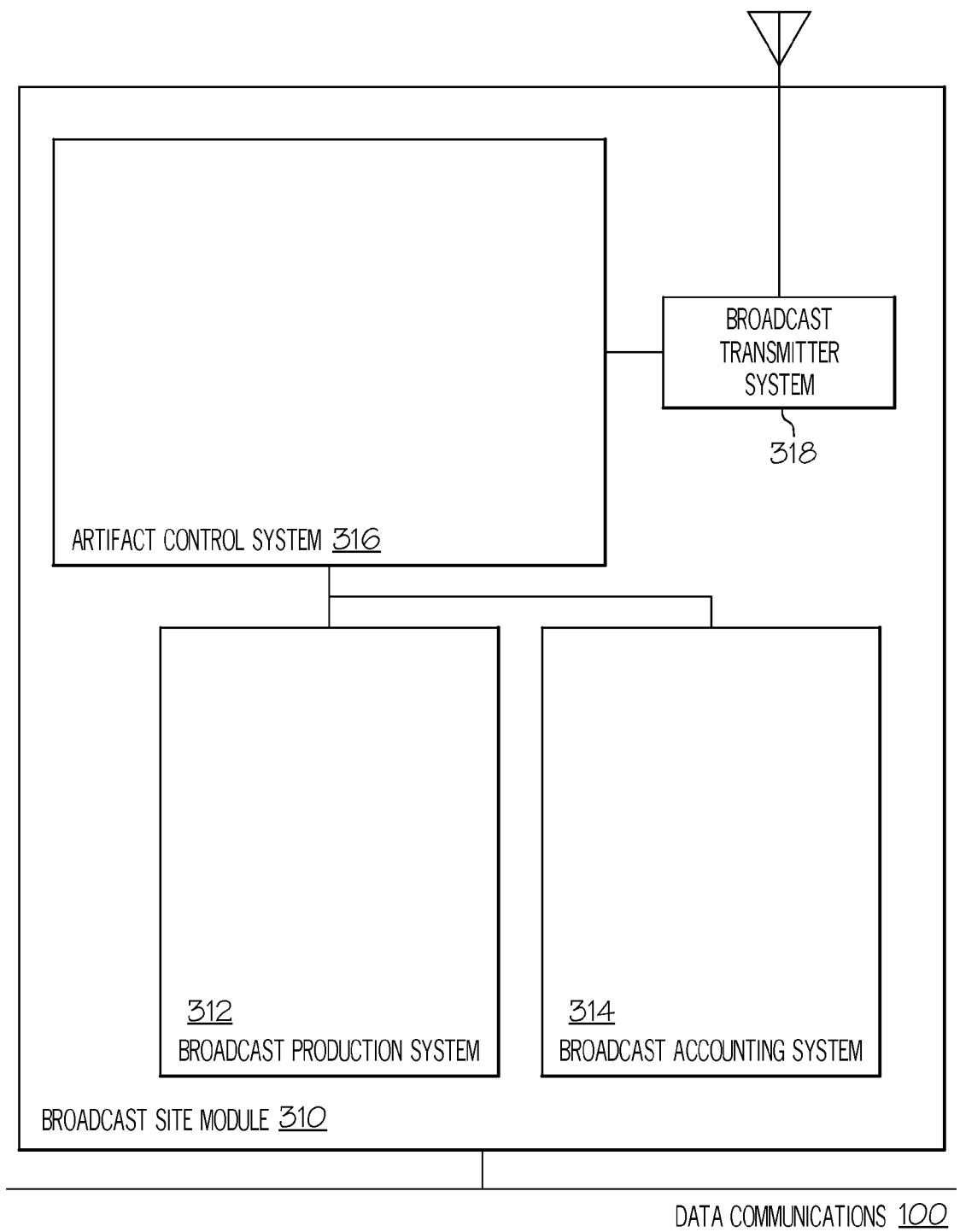
FIG. 3 is a block diagram of a system for the analysis and designation of insertion sites for identifying artifacts with a representative embodiment of the present disclosure.

FIG. 3 is a diagram of a system for detecting potential sample sites for inserting identifying artifacts in accordance with a representative embodiment of the present disclosure. Broadcast Site Module (310) is connected to data communications network (100) and contains Broadcast Production System (312) and Broadcast Accounting System (314) and Artifact Control System (316). Periodically, the Broadcast Accounting System (314) generates a set of instructions for the Broadcast Production System (312), known within the industry as a "broadcast log." This electronic instruction set establishes the sequence in which digital audio files are to be inserted into the broadcast digital audio stream sent to the broadcast transmitter (318) for conversion to an analog signal and distributed by radio frequency spectrum transmission.

With reference back to FIG. 1, upon the completion of the match to an authenticated commercial profile, either within Master Profile Database (106) or Master Advertiser Database 204, a Commercial ID (107) associated with the Commercial Profile (104) is determined, for example by indexing to the Commercial Profile (104) within Master Profile Database (106). The determined Commercial ID (107) is inserted along with the Commercial Audio File (101) as a record in the Broadcast Content Database (109) through the Broadcast Production System (312). As an added safeguard, as seen at (108), the Artifact Control System (316) injects the Commercial ID (107) in the form of a digital artifact into the Commercial Audio File (101) prior to its insertion into a record of the Broadcast Content Database (109).

During the sequencing process whereby the Broadcast Production System (312) reads the broadcast log prepared by the Broadcast Accounting System (314), each commercial audio file is read by the Artifact Control System (316) to verify that the Commercial ID (107) contained within the carrier of the Commercial Audio File (101) corresponds to the Commercial ID (107) contained in the instruction set for the event contained in the broadcast log.

It will be appreciated by one of ordinary skill in the art that the methods described above may be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Accordingly, the present disclosure may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

As will be appreciated, the processes in embodiments of the present disclosure may be implemented using any combination of computer programming software, firmware or hardware. For example, an article of manufacture containing the computer programming code is used by either executing the code directly from the storage device, by copying the code from the storage device into another storage device such as a hard disk, RAM, etc., or by transmitting the code for remote execution. The method form of the disclosure may be practiced by combining software and/or hardware to complete the steps of the disclosure. An apparatus for practicing the disclosure could be one or more computers and storage systems containing or having network access to computer program(s) coded in accordance with the disclosure.

While the disclosure has been particularly shown and described with reference to representative embodiments, it will be understood by those skilled in the art that various changes in form and detail may be made therein without departing from the spirit and scope of the claimed subject matter. Any variations, modifications, additions, and improvements to the embodiments described are possible and may fall within the scope of the disclosure as detailed within the following claims.

What is claimed is:

1. A method comprising:
receiving a data file containing at least audio data;
associating the data file with a first commercial identifier;
storing the first commercial identifier in association with the data file;
receiving a second commercial identifier contained in a first instruction of a commercial insertion order, wherein the commercial insertion order is requesting that the data file be transmitted in accordance with the first instruction within the commercial insertion order;
reading the first commercial identifier, in accordance with the first instruction of the commercial insertion order, prior to transmission of the data file;
verifying, prior to transmission of the data file, that the first commercial identifier stored in association with the data file corresponds to the second commercial identifier contained in the first instruction of the commercial insertion order;
permitting transmission of the data file over a communications path upon verification that the first commercial identifier corresponds to the second commercial identifier contained in the first instruction of the commercial insertion order; and
prohibiting transmission of the data file if there is no verification that the first commercial identifier corresponds to the second commercial identifier contained in the first instruction of the commercial insertion order.

2. The method of claim 1, wherein the data file is a commercial advertisement.

3. The method of claim 1, wherein the data file is received via the Internet.

4. The method of claim 1, further comprising analyzing the data file to generate a profile of the data file.

5. The method of claim 4, wherein the profile is no more than 1024 bits.

6. The method of claim 4, wherein associating further comprises:
comparing the profile to a plurality of authenticated profiles;
determining a match of the profile with one of the plurality of authenticated profiles; and
associating the data file with the second commercial identifier, which is associated with the authenticated profile.

7. The method of claim 1, further comprising:
inserting the first commercial identifier, stored in association with the data file, within the data file, prior to transmission of the data file.

8. A system comprising:
a memory containing program instructions;
a processor for executing the program instructions in the memory;
a digesting system, utilizing the processor and program instructions, that processes a data file to produce a commercial profile;
a matching system, utilizing the processor and program instructions, that compares the commercial profile with a set of commercial profiles prior to broadcast of the data file, wherein the matching system identifies a commercial identifier associated with one commercial profile of the set of commercial profiles matching the commercial profile;
a digital insertion system, utilizing the processor and program instructions, that inserts the commercial identifier into the data file; and
a transmission system, including a transmitter, and coupled to the digesting system, matching system, and digital insertion system, that:
extracts a commercial identifier contained within a data file prior to broadcast of the data file by the transmission system;

compares the extracted commercial identifier with a commercial identifier specified in an insertion order requesting transmission of the data file; and verifies that the data file to be transmitted by the transmission system is specified in the insertion order when there is an occurrence of a match between the extracted commercial identifier and the commercial identifier specified in the insertion order requesting transmission of the data file.

9. The system of claim 8, wherein the data file is a commercial advertisement.

10. The system of claim 8, wherein the data file is received via the Internet.

11. The system of claim 8, further wherein the commercial identifier is specified in a commercial insertion order requesting that the data file identified with the commercial identifier be broadcast in accordance with the instructions within the commercial insertion order.

12. The system of claim 8, further wherein analyzing the data file to generate a commercial profile of the data file includes demodulating a portion of the data file.

13. The method of claim 4, wherein the commercial profile is no more than 1024 bits.

14. A non-transitory computer-readable medium having instructions stored thereon that, in response to execution by at least one computing device, cause the at least one computing device to:

receive a data file containing at least audio data;

associate the data file with a commercial identifier associated with content within the data file;

store the commercial identifier in association with the data file; and read the data file to verify that the commercial identifier stored in association with the data file corresponds to a commercial identifier contained in an instruction of the corresponding commercial insertion order prior to transmission of the data file over a transmission system in accordance with a commercial insertion order.

15. The non-transitory computer-readable medium according to claim 14, further causing the computing device to:

analyze the data file to generate a profile of the data file.

16. The non-transitory computer-readable medium according to claim 15, further causing the computing device to:

compare the profile to a plurality of authenticated profiles;

determine a match of the profile with one of the plurality of authenticated profiles; and associate the data file with a commercial identifier associated with the authenticated profile.

17. The non-transitory computer-readable medium according to claim 15, wherein the commercial identifier is specified in a commercial insertion order received in conjunction with receiving the data file, and wherein the commercial insertion order requests that the data file be broadcast in accordance with the instructions within the commercial insertion order.

* * * * *